Sept. 8, 1964   J. P. GALLAGHER   3,148,103
METHOD OF MAKING PLASTIC CONTAINERS
Filed July 2, 1957   6 Sheets-Sheet 1

INVENTOR
John P. Gallagher

Sept. 8, 1964         J. P. GALLAGHER         3,148,103
              METHOD OF MAKING PLASTIC CONTAINERS
Filed July 2, 1957                      6 Sheets-Sheet 2
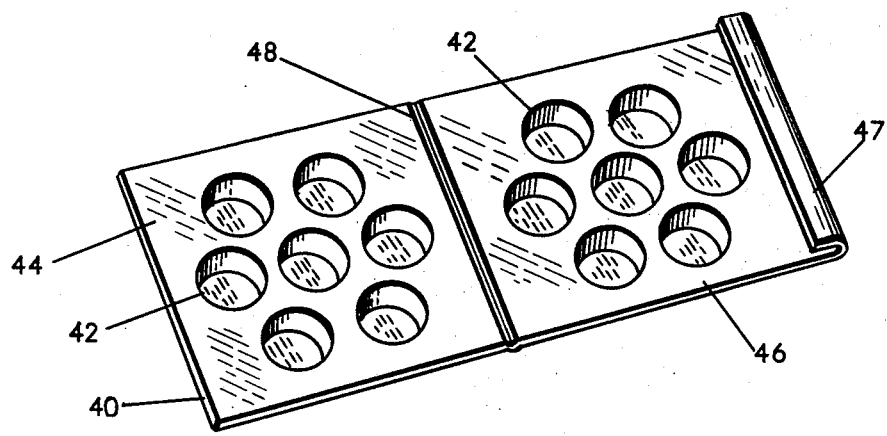
FIG. 4
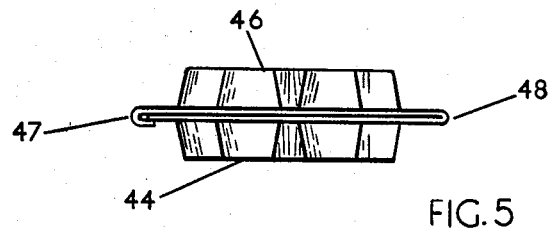
FIG. 5
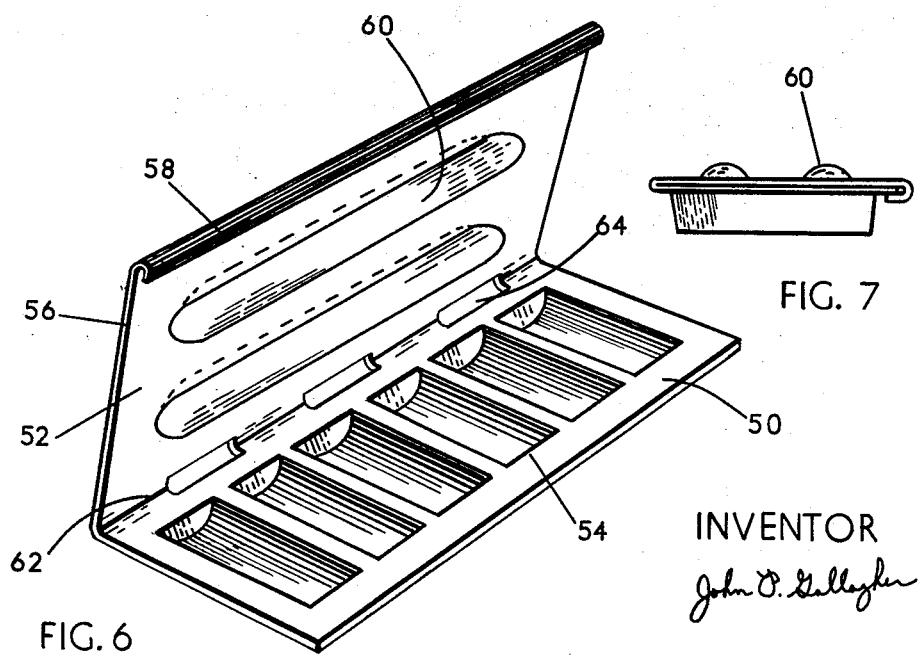
FIG. 7
FIG. 6
INVENTOR
John P. Gallagher

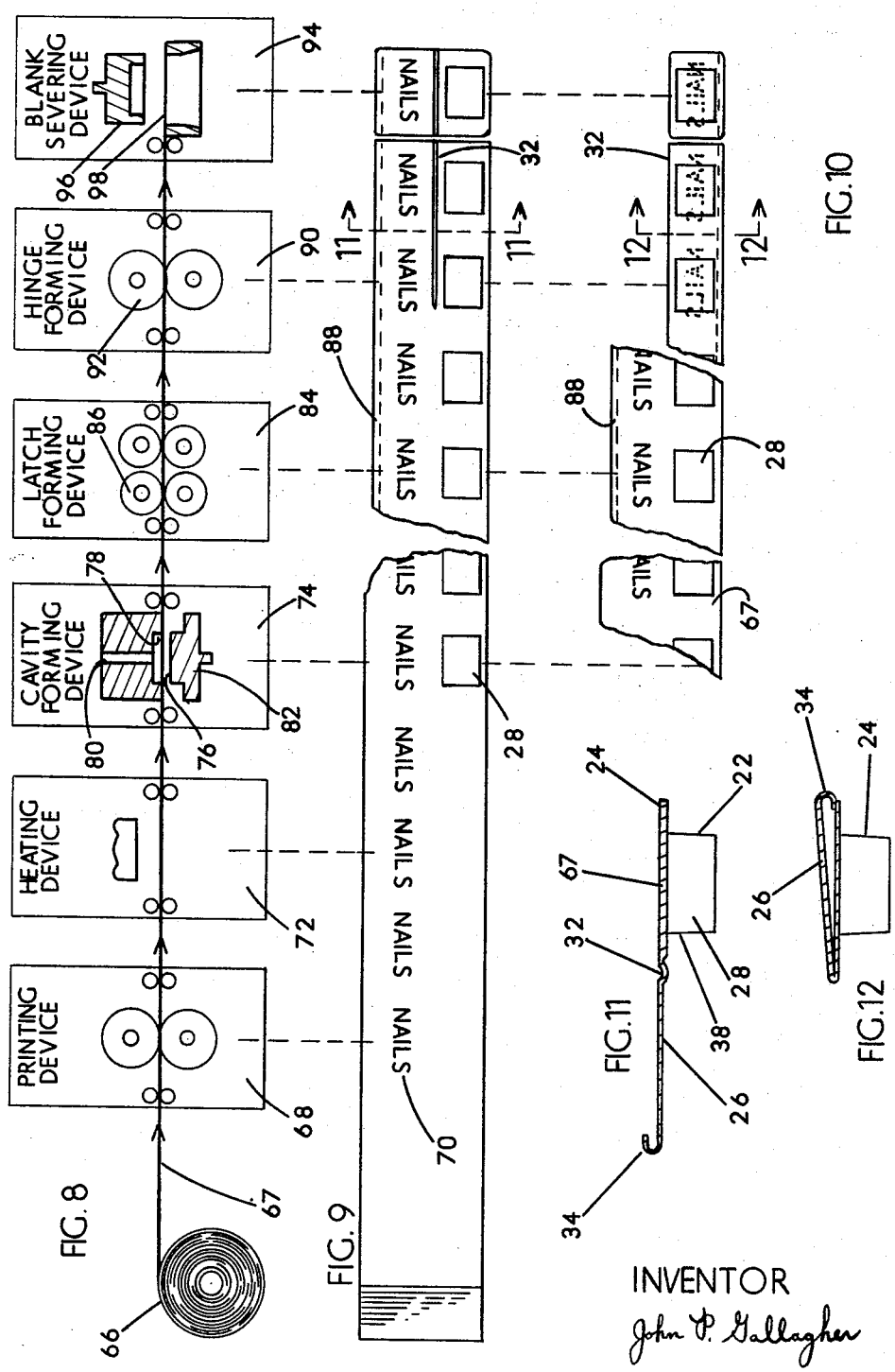

Sept. 8, 1964
J. P. GALLAGHER
3,148,103

METHOD OF MAKING PLASTIC CONTAINERS

Filed July 2, 1957
6 Sheets-Sheet 4

INVENTOR
John P. Gallagher

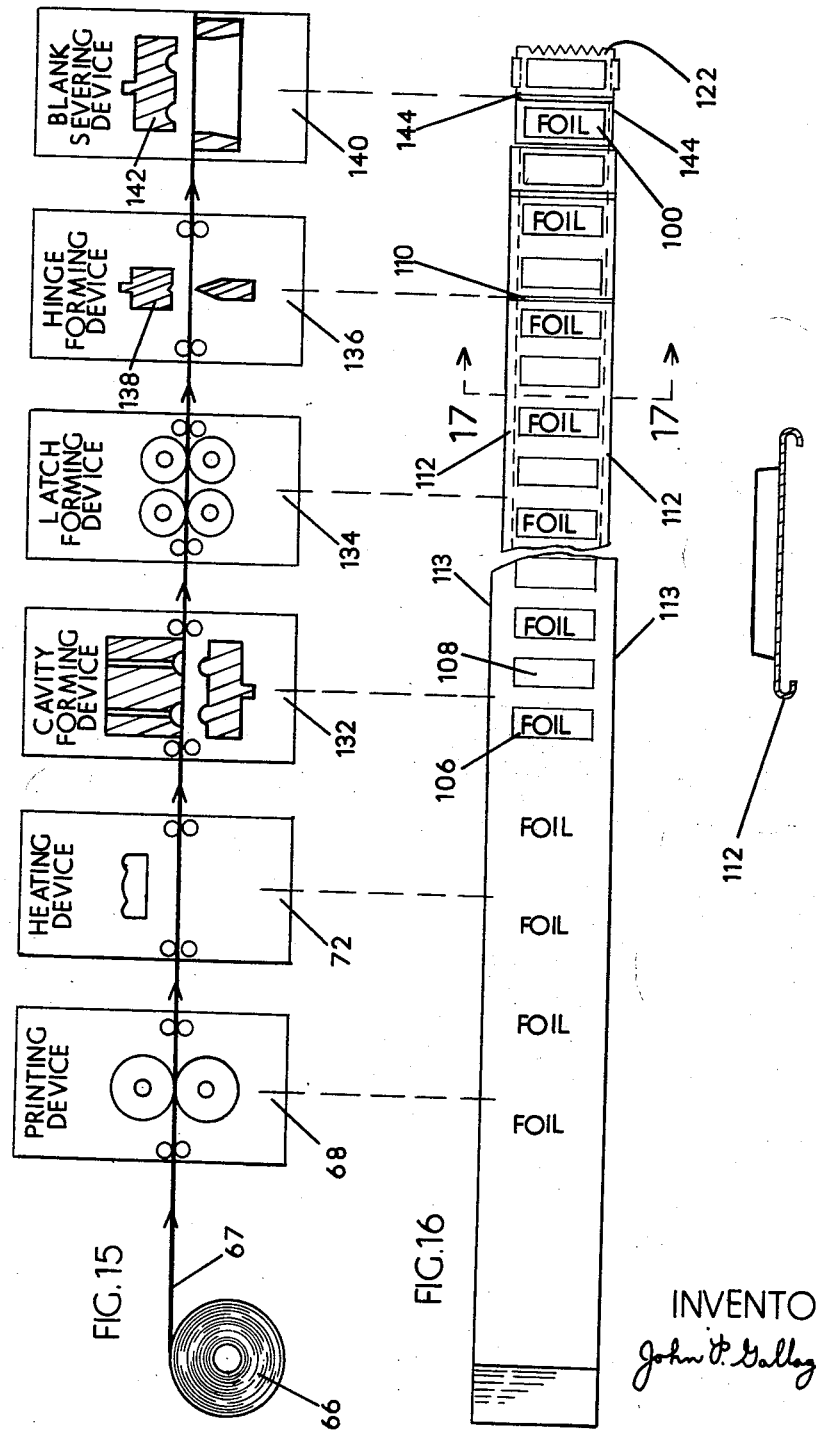

Sept. 8, 1964    J. P. GALLAGHER    3,148,103
METHOD OF MAKING PLASTIC CONTAINERS
Filed July 2, 1957                6 Sheets-Sheet 6

INVENTOR
John P. Gallagher

United States Patent Office 3,148,103
Patented Sept. 8, 1964

3,148,103
METHOD OF MAKING PLASTIC CONTAINERS
John P. Gallagher, 2858 N. Keating Ave., Chicago 41, Ill.
Filed July 2, 1957, Ser. No. 669,548
2 Claims. (Cl. 156—224)

The present invention relates to a plastic container.

A principal object of the invention is to provide a plastic container of entirely new character, a container that is of integral, one-piece construction, self-supporting, transparent, is easily opened, and which remains closed in normal handling thereof as when previously closed with contents therein.

An important advantage of the invention is that the container is entirely transparent so that the contents therein are easily observed and the container retains its preformed shape to the end of protecting the enclosed contents, and presenting them most effectively to view, as distinguished from a limp bag type container heretofore known.

Another important advantage of the invention is that the container may be made from uniform plastic stock in sheet form, and such plastic stock material forms the entire container including the latch means which detachably retains it in closed condition. In the realization of this feature, the container utilizes to a maximum degree the physical, mechanical and fabrication properties of a thermoplastic sheeting.

The container of the invention is re-usable, but because of its low cost, it may be used as a disposable packaging means for a great variety of merchandise. This advantage results from the fact that the container wall is of small thickness, and only sufficiently thick to make it rigid and self-supporting, and effective for protecting the merchandise contained therein.

A further object of the invention is to provide a simplified structurally-shaped transparent plastic container that may be inexpensively color printed for decoration and advertising purposes.

Another object is to provide a lightweight plastic container capable of being telescopically stacked within an identical container, thus greatly reducing storage, handling, and transportation cost of the empty containers.

A still further object is to provide a plastic container that may be readily and quickly unpacked, filled and closed, substantially reducing package filling costs.

Another and prime object of the invention is to provide a transparent plastic container which is economically feasible due to reduced material requirements, and low tooling, fabrication, color decorating, storage, transportation and filling costs, for a wide variety of staple marginal commodities, such as fruit, vegetables, meat cuts, butter, eggs, among food items, and string, thread, ribbon, paper, foil, tape, tacks, screws, bolts and like objects, wherein added sales appeal can be artistically rendered by the novel three dimensional transparency.

One or more edges of the container may possess a series of serrations for severing material dispensed from within, such as foil, paper, ribbon or tape. Holes may be perforated in a marginal edge portion of the container for suspension of it from a rack or hook of a display device.

The plastic sheet may be of uniform or multi-various thickness and color to provide artistic color contrast and mechanical requirements of strength for the commodity to be packaged.

Other objects and advantages will be apparent from the description as set forth below.

The invention is illustrated by way of example in the accompanying drawings in which:

FIGURE 4 is an isometric view of a modified form of the basic container, in open position, possessing multiple cells and a single latch element.

FIGURE 5 is an end elevation view of the container of FIGURE 4, with the cover closed and latched.

FIGURE 6 is an isometric view of a multiple cell container whose cover is rib-reinforced for structural strength, and the hinge is mitigated for increased flexibility.

FIGURE 7 is an end elevational view of the container of FIGURE 6 with the cover closed and latched.

FIGURE 8 diagrammatically illustrates a forming method and apparatus for a single or multiple cell container possessing a single latch element as characterized by the features of the present invention as shown in FIGURES 1 to 7.

FIGURE 9 is a top view of a strip of plastic material representing various stages of formation of the container in the use of the apparatus shown in FIGURE 8, and with the finished container normally in open position.

FIGURE 10 is a top view of the strip of FIGURE 9, indicating an additional forming step, whereby the finished container is normally closed.

FIGURE 11 is a cross sectional view of the formed sheet, taken on line 11—11 of FIGURE 9, indicating the use of a sheet of multi-various thickness and color.

FIGURE 12 is a cross sectional view of the formed sheet taken on line 12—12 of FIGURE 10.

Figure 13:
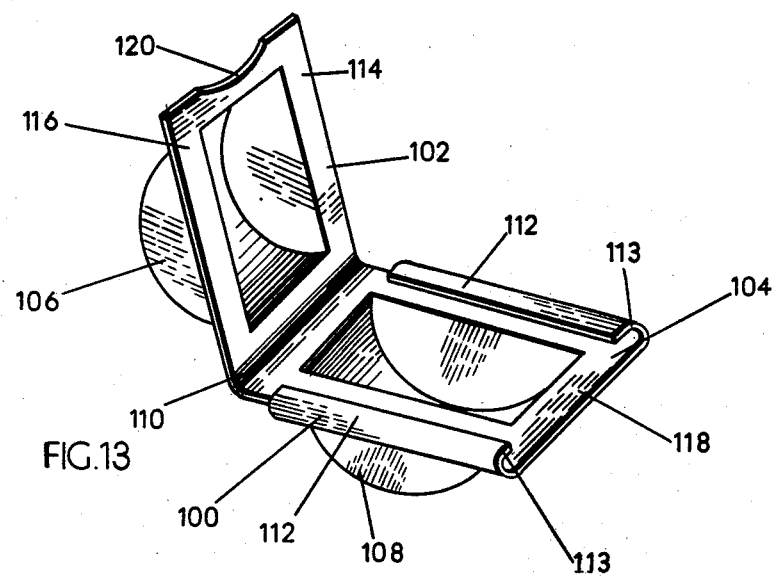

FIGURE 13 is an isometric view of a modified form of container including a dual-element latch.

Figure 14:
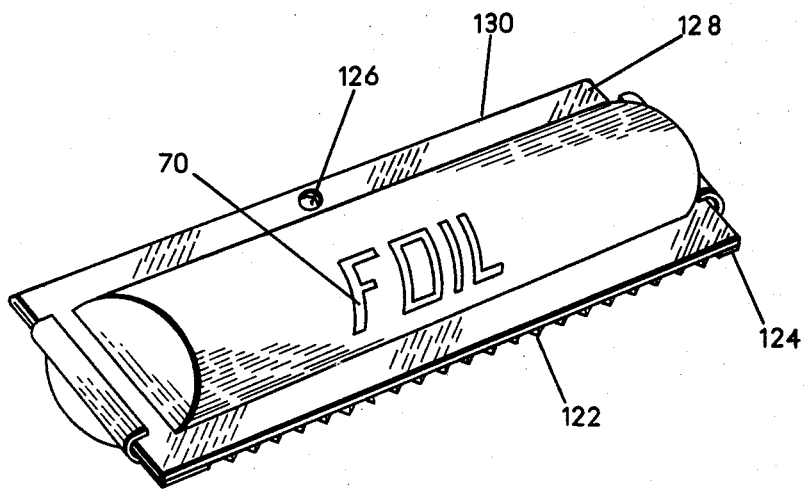

FIGURE 14 is an isometric view of a congruent container, in a closed and latched position, possessing a serrated edge for severing material, and a suspension aperture.

FIGURE 15 diagrammatically illustrates method and apparatus for forming the container of FIGURES 13 and 14.

FIGURE 16 is a top view of a strip of plastic material showing portions in various stages of completion, as formed by the apparatus shown in FIGURE 15.

FIGURE 17 is a cross sectional view of the formed sheet taken on line 17—17 of FIGURE 16.

Figure 18:
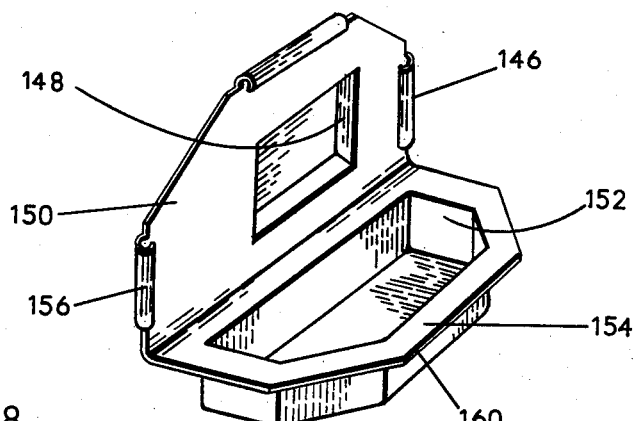

FIGURE 18 is an isometric view of a non-congruent, multi-element latch container.

Figure 19:
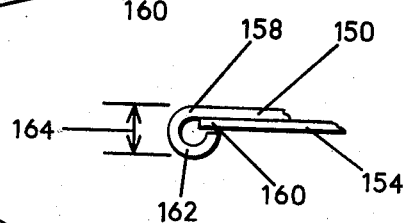

FIGURE 19 is an enlarged side elevational view of the configuration of a multi-element latch of the kind included in the container of FIGURE 18.

Figure 20:
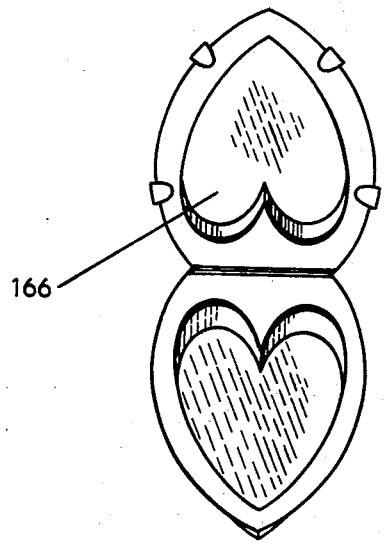

FIGURE 20 is an isometric view of a modified form of congruent, multi-element container.

To set out the broad aspects of the invention, a brief summation is herein presented. Heretofore the great variety of transparent plastic containers and vials commercially available consisted of two or more piece construction and may be divided into four main groups.

The first group embraces the so-called one piece containers (trade terminology) which are normally of two piece construction. A container of this group generally comprises a body element and lid that are separate and distince injection or compression moldings. The body and the lid are pivotably secured by a hinge pin or the like. A latch is generally molded on the wall element for frictionally engaging a molded depression in the lid.

The second group included a large variety of containers that are tubular or polygonal in cross-section. These containers employ a friction or screw type lid as closure means. The body elements are most commonly injection molded. The lids or covers are either injection or compression molded and in some instances constitute metal stampings.

The third group consists of three piece construction. A container of this group incorporates an extruded wall element having a cup shaped bottom element cemented or secured by other means to the lower extremities. A cup shaped cover frictionally engages the top extremities of the tube.

The four groups of containers mentioned above wich construction. This type of container comprises a shaped plastic receptacle cemented or stapled to a flat printed cardboard backing and in some instances a flat plastic backing.

The four groups of containers mentioned above may have many desirable features but also possess many inherent disadvantages, the primary objection being high cost. This is somewhat minimized by added sales appeal and reusability of the first three groups, the fourth group being of a disposable nature.

The factors attributable to the high cost of these containers which the container of the present invention eliminates or substantially reduces are as follows:

Containers of the first two groups are manufactured by compression or injection molding techniques. Molds must be substantially cooler than the melted semi-fluid thermoplastic molding material. The material cools as the distance it is forced through the cavities of the mold increases. The amount of cooling if excessive in thin sections of a cavity may be sufficient to prematurely solidify the molding material, resulting in incomplete filling of the cavity or introducing sufficient stress into the molding that cracking or crazing of the molding will be inevitable.

Except for relatively small parts it is not practical to injection or compression mold material with a wall thickness of less than .030". In moldings utilizing such thin wall sections heavy beads or ribs are usually incorporated in the design of the part to act as runners to convey the material to the remote sections of the mold.

Extremely high molding pressures must be used to force the material through the cavity, pressures as high as 20,000 p.s.i. sometimes being employed. Naturally such pressures require massive machinery and molds of exacting craftsmanship.

In most instances such containers have wall thicknesses in excess of what is required to support the container and protect the merchandise. This increased cost is thus due to limitations in the means and methods of making the containers rather than because of requirements of the containers for protecting the articles therein, such as thickness, shape, size, et cetera. Due to the high cost of molding material research has been made by molders, equipment manufacturers and material suppliers to reduce wall thickness. Only small gains have been made in the art to date, and they consist mainly in employing heavier equipment and increasing the amount of plasticizers added to the molding powders that increase their flow but reduce light transmission therethrough, tending towards opaque moldings as well as increasing toxicity and odor.

The container of the present invention eliminates this problem by utilizing a wall thickness only sufficiently great to support the container and protect the merchandise enclosed therein. I have found that the container in many instances can be successfully constructed from a single sheet of extruded thermoplastic sheeting with a wall thickness of less than .005", resulting in a wall thickness greatly less than that of a conventional compression or injection molded container.

Another common disadvantage with the first three groups of containers is that thermoplastic materials are affected by thermal expansion and contraction due to temperature change which affects their dimensional stability. In addition they are affected by cold flow or creep that manifests itself without temperature change, resulting in an instantaneous elastic deformation of the material.

Such problems are serious in the first group of containers in that the hinge pins may distort and bind, resulting in the containers breaking when opened or closed. The locking latch may also be affected and rendered inoperative.

The second and third group depend on frictional engagement of the lid with the body to hold the lid in place. Dimensional instability may result in a condition wherein the lid will no longer frictionally engage the container. Or the lid or container may sufficiently contract or expand to render it impossible to remove or insert the lid without breaking or damaging either container or lid.

The container of the present invention does not incorporate hinge pins nor is a friction lid employed, thus the opening and closing of the container is not affected by normal dimensional instability or cold creep of the thermoplastic material.

A cost factor attributed to the containers of the first group is that normally complicated and expensive tooling is required for their manufacture. The container of the present invention being formed from a sheet of transparent thermoplastic material may employ simple forming methods of which there are many. (Ref. Forming Thermoplastic Sheet, by Minikes, Modern Plastics Encyclopedia, vol. 32, No. 1A, 1954, at p. 202 is a listing of twenty-one methods.) The most prominent method is vacuum forming, wherein tooling costs are about one-third of those of compression or injection molds.

The containers of the four groups are of more than one piece construction. Separate tooling is required for the lid and the container. The container of the present invention being of one piece construction materially reduces tooling requirements.

Empty containers of the first and third groups in general cannot be telescopically packed. Those of the second and fourth groups may be telescopically packed. However, the covers for the second, third and fourth groups are bulk packed and shipped, this requiring additional handling, inventory control, storage and assembly cost on the part of the user. The container of the present invention may have its cover folded back and be telescopically packed, reflecting sound savings in inventory, storage, transportation and assembly costs.

Containers of the first, second and third groups, being produced from granulated plastic molding powders, may be color printed or decorated only after fabrication. This necessitates between station storage facilities for the bulky containers in the fabrication plant. Printing or color decorating methods such as spray stenciling, silk screening, printing with rubber rolls or hot stamping are the most common methods used. All of the above methods in regards to decorating a container after fabrication are not of a high speed nature. The containers are normally hand inserted or at the best hopper fed for printing. Registration is poor and the work is generally limited to not more than two color applications. The container of the present invention being formed from a flat sheet stock may have the sheet color printed on high speed automatic presses prior to forming. The work may be of an intricate multi-colored nature congruent with complex curves on either the interior or exterior surface of the container.

The fourth group of containers are partially plastic, or all plastic, depending upon whether the backing material of the sandwich construction is paper or plastic. A serious objection to this type of container is that the shaped plastic portion must be stapled or glued to the backing material.

In many specific instances it is desirable for a merchant or potential customer to remove the commodity from the container for inspection. If the container is damaged when opened, to return the merchandise to the said container may prove awkward. Re-gluing or re-stapling is inconvenient and usually results in an unsightly package that would be unacceptable to a great many customers.

In addition, if the container is glued and hermetically sealed, it may distort due to atmospheric changes. Even when stapled to a flat cardboard and not hermetically sealed, distortion takes place due to the natural characteristics of cold flow and elastic deformation of the plastic material. Stapling the container restrains the natural tendencies of creep in the thermoplastic material and introduces stress sufficient to cause the backing to distort and disk, resulting in an unattractive appearance.

Other forms of merchandise such as tacks, screws or edible food products wherein only a portion of the merchandise is used at one time, requires a container that can be reclosed or opened many times. It is apparent that many commodities are unsuitable for packaging in a container that is not hinged or reclosable. The container of the present invention can be readily opened and closed, repeatedly.

The present invention is a unique low cost packaging means that is adaptable to a wide variety of products under many variances of distribution and sales factors. Many commodities can be transparently packaged in the container, that heretofore were unsuitable to plastic containers of the prior art, due either to cost or unsuitability of functional requirements.

Figure 1:
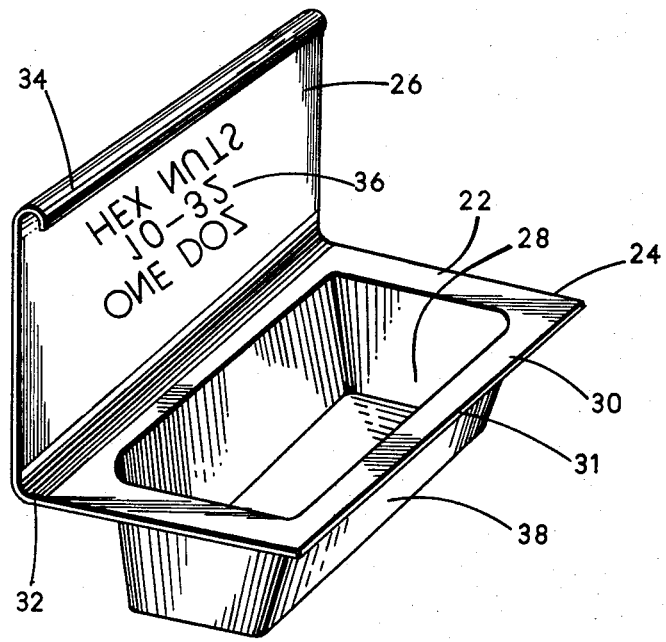
FIGURE 1 is an isometric view of the basic container possessing a single cell, and single latch element.

Referring now to FIGURE 1 the invention will be described in detail. The container 22 is constructed solely from a single sheet of transparent thermoplastic material.

I have found that a great variety of transparent thermoplastic sheeting materials are suitable for the construction of the container and include cellulose derivatives, acrylics, polyvinyl chlorides, polystyrene, polyesters, butyrates, and other well known thermoplastic derivatives some of which bear well known trade names.

Generally any transparent thermoplastic material that may be easily cast, calendered or extruded into sheets possessing sufficient rigidity and capable of being formed and bent through the application of heat and pressure are suitable for the container. The word "sheet" or "sheeting" is used throughout the description herein for the purpose of continuity and is inclusive of the term "film" which is an optional term for sheeting of less than .010 of an inch thickness, in the plastics industry.

The container as illustrated in FIGURE 1 comprises two main half portions 24 and 26. The upper portion 26 will be referred to as the "cover half" and the bottom portion 24 as the "lower half" for the purpose of clarity; it will be noted from referring to FIGURES 4, 13 and 20 the choice is arbitrary as both half portions are substantially identical except for a latch element.

The container of FIGURE 1 has a cavity or cell 28 formed in the lower half spaced from the marginal edges, generating a flange 30 lying in a common plane, and including an outer edge portion 31. The cover and lower halves have a common hinge portion 32 formed by tightly folding the sheet. A latch element 34 is formed on the cover half preferably at the swinging edge, by turning under the marginal edge portion, this being hook shaped in cross section.

Figure 2:
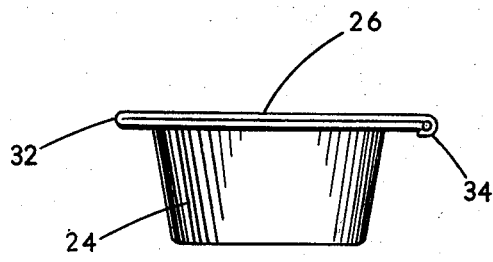
FIGURE 2 is an end elevation view of the container of FIGURE 1 with the cover closed and latched.

The container is sufficiently rigid to be self-supporting and to protect the merchandise contained within the cell, yet sufficiently flexible to allow the halves to be closed along the hinge 32 as shown in FIGURE 2 with the latch element 34 snapped over and around the edge portion 31 of the lower half 24, for locking the container.

Figure 3:
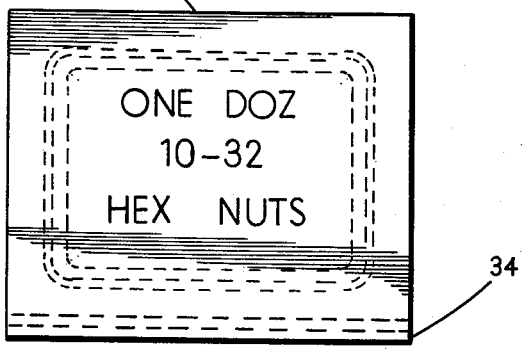
FIGURE 3 is a top view of the container of FIGURE 1 with the cover latched.

Artistic or descriptive material 36 may be imprinted on the flat surfaces of the sheet as shown in FIGURES 1 and 3. The side walls 38 of the cell are preferably tapered to facilitate forming the cell and stacking of the bulk containers within each other.

As I have mentioned, thermoplastic materials are subject to cold flow and creep. (Ref. Product Eng., June 1956, p. 175, McGraw-Hill.) Such conditions would affect rigid hinge and latch elements of injection and compression molded containers, and result in failure of the latch or breaking of the hinge due to binding.

The present container is of one piece construction, any cold flow or creep that may result from stressing the sheet during fabrication mitigates itself in even expansion of all the elements of the container due to their relatively light gage and non-critical dimensional relationship to each other. In addition a thin sheet may be orientated to give it excellent toughness and rigidity.

This results in a high mechanical advantage of plastic sheeting over plastic moldings as the latter are not applicable to molecular orientation, which is easily performed by stretching a plastic sheet. (Ref. "Materials of Construction, Wood, Plastics, Fabrics," by A. Dietz, Van Nostrand, 1949, p. 241.)

Thus relatively light gage sheeting may be employed in the construction of the present container that permits the halves to be separated and closed many times without injury to the hinge or latch and yet affords sufficient rigidity to protect the merchandise contained within.

Such a container is ideally suited for a wide variety of commodities such as tacks, screws, fishing lures, hardware items, meats and edible fruits and berries, to mention a few. The commodity is transparently displayed yet well protected at low cost.

The cover half 26, in the present form, is essentially planar, and cannot be elongated, in hinge-to-latch direction, and hence when it is closed, it resists forces acting in that direction as would unhook the latch from locking engagement with the edge of the lower half. The cell or cavity 28, particularly because of the end elements of the surrounding wall 38, provides ample resistance to bowing of the lower half as would withdraw the edge portion 31 from the latch 34. Furthermore, the thickness of the latch 34 and edge portion 31 is such, relative to the other dimensions of those elements, to resist flexing such as would unlatch them. The present arrangement provides convenience in manually opening the container by external force, applied as by the hand, one hand grasping the cavity 28 and the other the latch 34. It is within the broad compass of the invention however to provide the cavity or cell in the cover half, i.e., the same half as the latch, and have the lower half planar, but this arrangement would be less desirable since it would require greater thickness in the lower half to resist unhooking of the latch, and it would not be so convenient to open the container, because in the absence of the cell or cavity it would be difficult to grasp the lower half and withdraw it from the latch.

Referring now to FIGURES 4 and 5, a variation of the invention is illustrated. The container 40 is basically the same as that of FIGURE 1 except that a multiple number of cells 42 are formed in the lower half 44 and an identical number of cells are formed in the cover half 46. When the cover half is folded down along the hinge line 48 its cells are congruent with the cells of the lower half 44 as shown in FIGURE 5. The cover half 46 includes a substantial portion that is straight in hinge-to-latch direction which resists elongation of the cover half and consequent unhooking of the latch from the lower half in the closed container.

It will be noted that the side walls of the cells are tapered and that the bulk containers can be telescopically packed within one another.

Such a container may be used to hold one or more objects depending on the number of congruent cells.

Forming a communicating cell or series of cells in the cover and lower halves serves a particularly distinct purpose. An excessively deep cell would cause excessive thinning of the sheet when it is formed or necessitates the use of a heavier gage sheeting. Such a condition would not afford maximum economy; such may be more easily achieved by forming a cell only half the required depth in the lower half and have it communicate with a cell of equal depth in the cover half.

A container of this type is suitable for packaging items that must be separated from each other such as eggs, tomatoes, et cetera to prevent damage from excessive consumer handling on counter display yet demanding visual means of inspection.

At times the functional requirements of the container of the present invention will necessitate the use of heavier gage sheeting to effectively support and protect heavier objects. When the sheeting thickness is increased flexibility of the hinge for separating and closing the halves might be impaired if modifications were not made. Such a modification is shown in FIGURE 6.

The container of FIGURES 6 and 7 is designed for supporting and separating from each other sharp metal cutting tools which have delicate edges such as drills, reamers, taps and end mills.

The lower half 50 of the container 52 has a series of half cylindrical cells 54 for enclosure and separation of the merchandise. The cover half 56 has a hook shaped latch 58 similar to that of FIGURE 1.

A series of half round ribs 60 extend across the cover half for increasing the rigidity of the container as shown in FIGURES 6 and 7 and preventing it from buckling from the weight of the merchandise. The hinge 62 has a series of rectangular cutouts 64 therein to increase the flexibility of the hinge and reduce the force required to open or close the halves. Thus utilization of structural ribs provides added strength and enables use of material of lesser thickness.

The prime advantages of the present container from the standpoint of methods of manufacture over the prior art and particularly over injection and compression molded containers will be readily apparent to those skilled in the art by now referring to FIGURES 8 to 12.

The container of the present invention is a means of packaging, protecting and merchandising a great many staple commodities. To obtain this identity it first of all must fulfill the stringent requirements of economical feasibility; which is reflected in material labor and equipment costs.

Plastic resins and molding compounds are relatively expensive materials and realistic cost must be based on price per cubic inch of material. The average price of the more common transparent plastic materials varies from about $0.013 per cubic inch for vinyl, to about $0.022 per cubic inch for cellulose acetate (average price as of 1956). I have found that for a given size, the present container can utilize a wall thickness of ⅙ to ⅓ of that of a like volume container produced by molding techniques.

I have also found that a given size of container of the present invention can be fabricated, decorated and bulk packaged with less labor required than a molded container. In addition, cost of tool changes for various size containers is less in comparison to other methods.

Referring now to FIGURE 8 the simplicity of fabrication of containers of the present invention possesing a single hinge and latch element and of single or multiple cell arrangement as shown in FIGURES 1 to 7 is diagrammatically illustrated.

A roll 66 of light gage transparent plastic sheeting 67 possessing the appropriate physical and mechanical properties of rigidity suitable for the container that is to be fabricated is fed through a printing device 68 such as a rotary press employing rotogravure, typographic, dry offset, transfer, lithographic or flexographic methods of printing, which are well known arts. Suitable advertising or artistic inscriptions in single or multiple color, pertinent to the commodity that is to be packaged, is printed on the sheet as shown at 70, FIGURE 9 which is a plan top view of the sheet 67 passing through various stations of the processing apparatus of FIGURE 8.

The sheet upon completion of the printing operation enters a heating device 72 which accelerates drying of the ink or paint in the inscription 70. In addition the heating device softens the thermoplastic sheet for forming. Such a device may be a simple oven using hot air, radiant energy, or it may be the cavity forming device 74 itself wherein the flat surfaces of the mold 76 are internally heated. The purpose of heating the sheet in preparation to forming is to sufficiently plasticize or soften the sheet so it may be formed and drawn into the mold without tearing.

Tht heated sheet 67 is positioned in the cavity forming device 74 over the mold 76 and force is applied to draw the material into the cavity 78 of the mold generating the cell 28 (see FIGURE 1) in the sheet. The sheet may be forced into the mold by evacuating the air from the cavity such as by drawing a vacuum through an orifice 80, forcing the sheet into the cavity with air pressure, using a mechanical male or helper form 82 for pressing the sheet into the cavity, or any combinations of the three methods of force may be employed. The above techniques are familiar to those skilled in the art and are disclosed in many books and trade publications.

Upon completion of the cavity or cell forming operation at 74, the sheet is fed directly into the latch forming device 84. A series of heated rolls 86 turn a side edge 88 of the sheet over, generating the latch 34 as shown in FIGURES 1 and 11, the latter being a cross-sectional view of FIGURE 9 taken on line 11—11.

After completion of the latch forming operation at 84, the sheet is fed into the hinge forming device 90 where a series of heated rolls 92 crease the sheet and form the hinge 32 (see also FIGURE 1), reducing the stock thickness of the sheet (if necessary to impart flexibility along the hinge line 32) by application of sufficient pressure.

After completion of the hinge forming operation at 90, the sheet is fed into the blank severing device 94 wherein the sheet is cut to form the finished container, such a device may employ steel rule, rotary, or reciprocating male 96 and female 98 dies, all methods being old and familiar to the art. The die cutting may be a simple straight severing operation, or of an intricate nature for rounding corners or other specially contoured shapes. Needless to say, all elements of the process are synchronized for correct registration and alignment of the printed mateial and formed cell of the finished container.

It will be noted that the container 22 of FIGURE 11 as produced on the above described apparatus, has its cover half 26 in a normally open position. This is advantageous in directly telescopically stacking the containers as they leave the severing operation for bulk packaging of the containers for shipment.

However, at times it may be desired to have the cover half 26 normally closed as shown in FIGURE 12 which is a cross-sectional view taken on line 12—12 of FIGURE 10. The latter is a plan view of a sheet and illustrates an alternate method of producing the container with the cover half normally closed. In this method, the sheet 67 is fed through a printing, heating, cavity forming and latch forming device identical to that of FIGURE 8, and wherein the same operations are performed. The present process is altered in that an additional operation is performed. In the operation of forming the hinge, the sheet is additionally folded in half by a series of heated forming rolls which crease the sheet generating the hinge 32. The cover half 26 is in a near-closed position, but the latch 34 is not secured. Upon completion of the latch forming operation at 84, the sheet enters the blank severing device 94 for the severing operation. Here the operation is identical to that of FIGURE 8 except the container is folded over and dies must cut through the cover half 26 and lower half 24 as well as the extra thickness of the latch. Since the latch is resilient it can be momentarily compressed by the dies when severing the container from the sheet without distortion as force and compression are directed only on the ends of the latch, the inwardly disposed portion of the die along the marginal side of the latch being relieved. Whether the container is normally open or closed is a matter of choice in regards to functional requirement.

The sheet for producing the container need not be of uniform cross-section or color. If an extremely deep cell 28, FIGURE 11, is required to be drawn in the sheet excessive thinning of the side walls 38 would result when the material is drawn into the cavity forming device if the sheet were of uniform thickness, but such conditions may be circumvented by employing a sheet of non-uniform cross-sectional thickness. The portion of the sheet 67 forming the lower half wherein the cell 28 is formed may be of greater thickness than the portion forming the cover half, that is not drawn. Such a sheet may be easily produced by extrusion, welding a heavy and light sheet together or laminating a narrow strip onto a portion of the web sheet. Thus a sufficiently rigid cell portion is created and yet the hinge 32 and latch 34 being of thinner cross-section are easily bent to open and close the container.

The invention, as was stated, is a transparent container. Plastic sheeting is available in various shades of colored transparencies, certain colors are useful for artistic value such as a red tinted sheet for a valentine candy box, FIGURE 20. Colored transparent sheeting also possesses certain desirable optical qualities which are capable of filtering out undesirable light waves that may have adverse effect on a chemical and/or drugs.

The physical properties and colors of transparent plastic sheet may be utilized to a maximum degree in the present container.

As an example, if clarity and artistic contrast of product are desired in the container, sheets of two different transparencies may be joined together as described above; the heavier section 24 for the cell 28 may be of colored transparency.

An example of contrast would be a clear cover half 26 and blue transparent cell for packaging silver costume jewelry. If the entire container were of clear transparency sufficient contrast may not be present to highlight the natural color of silver.

Upon experimenting I have found that there are many color combinations possible for the container that not only allow the product to be viewed from any angle but also produce pleasing color harmony that renders many commodities more pleasing to the eye.

Referring now to FIGURE 13 a modification of the container for dispensing strip or filament wound materials is disclosed.

The container 100 consists of a cover half 102 and a lower half 104 each possessing congruent and identical half round cells 106 and 108. The cover half and lower half are joined and pivotally opened and closed on the common hinge 110.

The container is distinguished from the container of FIGURES 1 to 7 in that latching effect is accomplished by two hook shaped latch elements 112, formed on the opposed marginal side edges 113 of the lower half and extending at 90 degrees to the hinge.

The container may be closed and locked by spreading the latch elements 112 outwardly and closing the cover half 102 down on the lower half 104 and allowing the latch elements to be snapped over the opposed marginal flange elements 114 of the cover half similar to that shown in FIGURE 14. Thin sheet or filament wound material such as paper, foil, tape, string, thread, wire et cetera may be withdrawn from the cell between the inner surfaces 116 and 118 of the cover and lower halves of the closed container.

The cover half may have a half round cutout 120 to allow grasping of the material contained within by the fingers of the user for starting the dispensing operation. It also serves the purpose of a convenient fingernail guide for grasping the edge of the container when opening it.

The container of FIGURE 14 is similar in design to that of FIGURE 13 except that it is wider and has a toothed shaped serrated edge 122 on the front marginal end of the lower half 124. The serrated edge assists in cleanly tearing sheet wound material such as paper, tape or foil being dispensed.

It should also be noted that the described inscription, such as 70, can be conveniently printed on curved surfaces with extreme simplicity. A hole 126 or series of holes may be perforated communicating through the rear marginal elements 128 of the cover and lower halves adjacent to the hinge 130 for suspension of the container from a counter display or rack for merchandising purposes. It may be also employed by the user for hanging the container when dispensing material. As for example, thread wound on a paper core or wound in annular coreless self-supporting manner may be packaged in the container. The container may be hung by employing the perforated hole on the spool post of a sewing machine and the thread dispensed directly from the closed container into the apparatus of the machine.

The construction of a multiple element latched container is the same as that employed for a single latch element container as those of FIGURES 1 to 7 except for minor variations which are explained by now referring to FIGURES 15, 16 and 17.

A roll 66 of light gage transparent plastic sheeting 67 is fed through a printing device 68, heating device 72 and cavity forming device 132, and processed identically as that described in connection with FIGURE 8. However upon formation of the cells 106 and 108 in cavity forming device 132 the process is altered, in that two cells, in longitudinally spaced relation, rather than one, are formed.

The sheet 67 is fed into the latch forming device 134 wherein both edges 113 of the sheet are folded over to form two latch elements 112 as shown in FIGURE 16, which is a plan top view of the sheet passing through the various stations of the processing apparatus of FIGURE 15, and at FIGURE 17 which is a cross sectional view of the sheet taken on line 17—17 of FIGURE 16.

Upon completion of the latch forming operation at 134 the sheet is fed into the hinge forming device 136 wherein a set of heated forming dies 138 form the hinge 110 across the width of the sheet.

After completion of the hinge forming operation at 136 the sheet is fed into the blank severing device 140 wherein a set of dies 142 cut the completed container 100 from the sheet, generating the necessary outer profile and severing the unneeded portions at 144 of the latch elements (and serrating the front marginal edge 122 in the case of the container of FIGURE 14), and delivering the completed containers in proper position for telescopically bulk packaging.

A condition wherein an extremely large cell, in proportion to a narrow flange area may cause distortion of the edges of the sheet which might result in an uneven latch, is fully anticipated and may be circumvented by using a wider web of sheeting, trimming the edges of the sheet by rotary shears after forming the cell and prior to the sheet entering the latch forming device. The use of rotary shears for trimming the web of a sheet is well known.

Several species of the containers of the present invention have been described and illustrated. It is naturally understood that there are endless shapes and varieties that can be constructed from the basic principles as set forth in the specification, wherein from a single sheet of transparent thermoplastic material a container is formed, that has one or more cells for the enclosure of merchandise, possessing an integral hinge and one or more integral latch elements. By way of example other possible constructions and external appearing devices are shown in FIGURES 18, 19 and 20.

FIGURE 18 illustrates a container 146 that has a cell 148 in the cover half 150 which is non-congruent to the cell 152 of the lower half 154. Such a cell arrangement may be required for larger odd shaped items, as for hard goods such as hardware, sporting goods and small appliances. The outer contour of the cover and lower half need not be square or rectangular as shown in the prior examples but can be tailored to suit the actual contour of the packaged item. If the item is particularly bulky or heavy a series of latch elements 156 may be disposed along the marginal edges of the cover half of the container as good structural engineering practice would demand.

It will be understood that when a plurality of latch elements are disposed as shown in FIGURES 18 and 20 an extra operation must be performed for fabricating them after the blank severing operation. Such an operation may be a simple curling operation for formation of the latch elements. Heated reciprocating curling dies similar in design to those employed in the metal stamping industry may be used. Low cost leaf fixture utilizing the principle of a forming break or rotating curling rolls may also be used depending upon the particular edge contour of the container.

When such secondary operations must be performed and the latch element width is small or follows a curved surface, I have found that the U-shaped hook for the latch as shown in the prior illustration is not as ideally suited in this instance. Preferably the configuration as shown in FIGURE 19 is utilized, wherein the terminal end 158 of the cover half 150 is curled over and about the terminal edge 160 of the lower half 154 in a circular arc 162. Such a configuration is mandatory for proper curling action and in addition it provides added overall height, indicated at 164, which is advantageous on a narrow latch element for aiding in grasping the same in the fingers when opening or closing a container.

A container may also assume an external shape that is purely artistic as shown at 166 in FIGURE 20 which is a design of a valentine candy container. Such shapes are highly desirable from a merchandising standpoint. They may also include facsimiles of animals, seasonal symbols and other common identities; such as a rabbit for Easter, Santa Claus for Christmas, a pumpkin for Hallowe'en et cetera.

The invention is directed to a container made from a sheet or sheeting, as distinguished from molding, i.e., injection, compression or transfer molding techniques that utilizes powdered plastic materials, preforms (to make plastic molding powder into pellets or tablets for accurate and efficient handling of material in a compression molding cavity), and similar materials.

What I claim is:

1. A method of making containers from transparent thermoplastic self sustaining material, comprising bonding together a pair of continuous sheet elements to form a laminated effectively integral continuous sheet, one of the sheet elements being approximately half the width of the other and the two being bonded thereto on one side of a longitudinal median line thereby forming a thick side portion and a thin side portion in the bonded sheet, feeding the sheet along in longitudinal direction, forming cells therein at longitudinally spaced locations in the thick side portion, forming a hook continuously along an edge of the thin side portion of the sheet, forming a hinge along said median line, and cutting the sheet transversely between said cells.

2. A method of making containers from transparent thermoplastic self sustaining material, comprising providing a sheet of such material, imprinting indicia on a predetermined portion of the sheet designed to form a curved surface in the container formed as prescribed hereinbelow, forming a cell in said predetermined portion, a part of said cell constituting such a curved surface which has said indicia imprinted thereon, producing a hinge line in the sheet and thus forming a pair of halves one on each side of the hinge line and one of which includes said cell and said predetermined portion, forming a hook on the edge of the other half remote from the hinge line, whereby the halves may be folded about the hinge line to mutually superposed position and the hook releasably hooked over the corresponding edge of the first half to form a closed container.

References Cited in the file of this patent

UNITED STATES PATENTS

| | | |
|---|---|---|
| 417,166 | Geisenheimer | Dec. 10, 1889 |
| 781,222 | Morse | Jan. 31, 1905 |
| 1,624,719 | Dixon | Apr. 12, 1927 |
| 1,637,100 | Bothe | July 26, 1927 |
| 2,203,421 | Stevenson | June 4, 1940 |
| 2,276,414 | Morehouse | Mar. 17, 1942 |
| 2,324,974 | Greenup | July 20, 1943 |
| 2,355,559 | Renner | Aug. 8, 1944 |
| 2,385,486 | Bartoe et al. | Sept. 25, 1945 |
| 2,649,392 | Marshall | Aug. 18, 1953 |
| 2,687,157 | Cowan | Aug. 24, 1954 |
| 2,688,580 | Fingerhut | Sept. 7, 1954 |
| 2,695,207 | Windsor | Nov. 23, 1954 |
| 2,720,969 | Kendall | Oct. 18, 1955 |
| 2,736,656 | Marshall | Feb. 28, 1956 |
| 2,746,087 | Dolezal | May 22, 1956 |
| 2,759,650 | Randall | Aug. 21, 1956 |
| 2,796,634 | Chellis | June 25, 1957 |
| 2,845,104 | Frankel | July 29, 1958 |
| 2,885,136 | Grant | May 5, 1959 |

FOREIGN PATENTS

| | | |
|---|---|---|
| 15,698 | Great Britain | 1914 |
| 598,113 | Germany | June 7, 1934 |
| 937,938 | Germany | Jan. 1, 1956 |